United States Patent [19]

Maslen et al.

[11] 4,105,621

[45] Aug. 8, 1978

[54] THERMOPLASTIC POLYAMIDE COMPOSITION

[75] Inventors: John Maslen, Hoddesdon; William Hunter Taylor, Welwyn, both of England

[73] Assignee: Imperial Chemical Industries Limited, London, England

[21] Appl. No.: 763,700

[22] Filed: Jan. 28, 1977

[30] Foreign Application Priority Data

Feb. 20, 1976 [GB] United Kingdom ............... 6796/76

[51] Int. Cl.$^2$ ............................................. C08L 77/00
[52] U.S. Cl. ......................... 260/37 N; 260/45.75 W
[58] Field of Search ...................... 260/37 N, 45.75 W

[56] References Cited

U.S. PATENT DOCUMENTS

| | | |
|---|---|---|
| 3,418,263 | 12/1968 | Hindersinn et al. ............... 260/23 H |
| 3,418,267 | 12/1968 | Busse ............................. 260/37 N X |
| 3,630,988 | 12/1971 | Deyrup ............................. 260/37 N |
| 3,810,861 | 5/1974 | Tacke et al. ..................... 260/37 N |
| 3,864,302 | 2/1975 | Foley ............................... 260/37 N |
| 4,000,109 | 12/1976 | Smith et al. ............. 260/45.75 W X |

*Primary Examiner*—Lewis T. Jacobs
*Attorney, Agent, or Firm*—Cushman, Darby & Cushman

[57] ABSTRACT

A polyamide composition comprising 30 to 74.95% of a normally flammable polyamide, from 15 to 55% of a reinforcing agent, preferably glass fibre, from 5 to 30% of a halogenated flame retardant together with a synergist for the flame retardant consisting of a mixture of 5 to 30% zinc borate and from 0.05 to 1.5% of an oxide selected from antimony, zinc, lead, ferrous, ferric, stannous, stannic and cadmium oxides or mixtures thereof, all percentages being by weight of the total weight of the composition.

14 Claims, No Drawings

THERMOPLASTIC POLYAMIDE COMPOSITION

BACKGROUND OF THE INVENTION

This invention relates to fire-retardant, reinforced polyamide compositions and in particular to glass-filled compositions which are suitable for moulding into shaped articles by known processes such as injection moulding.

Fire-retardant polyamide compositions are known in which halogenated fire retardants are used together with synergistic amounts of metal oxides such as antimony trioxide or zinc oxide. Some end uses of these compositions require a combination of a high degree of fire retardancy and a high degree of resistance to carbonisation when subjected to excessive leakage of electrical current. Whilst the known compositions may give satisfactory levels of both these properties when no reinforcing agent is included in the composition, the presence of reinforcing agents, particularly glass makes the dual requirement of good fire retardancy and good resistance to carbonisation when subjected to electrical discharge difficult to achieve.

Fire-retardant, reinforced polyamide compositions have now been developed which show good levels of this combination of properties.

DETAILED DESCRIPTION OF THE INVENTION

Accordingly there is provided a reinforced polyamide composition comprising from 30 to 74.95% of a normally flammable polyamide, from 15 to 55% of a reinforcing agent, preferably glass fibre, from 5 to 30% of a halogenated flame retardant, containing at least 20% by weight of the flame retardant of halogen, together with a synergist for the flame retardant comprising a mixture of from 5 to 30% by weight of a zinc borate that is thermally stable at the processing temperatures of the polyamide and from 0.05 to 1.5% of an oxide selected from antimony oxide, zinc oxide, lead oxide, ferrous oxide, ferric oxide, stannous oxide, stannic oxide and cadmium oxide or a mixture thereof, all percentages of ingredients being by weight of the total weight of composition.

The preferred oxides are those which are white or off-white in colour because these allow much greater freedom when preparing coloured compositions. Antimony oxide is particularly preferred.

In addition to providing a fire-retardant polyamide composition the compositions of the invention show improved resistance to carbonisation when articles formed from the compositions are directly exposed to an electrical discharge, hereinafter termed "arc resistance," or when subjected to excessive leakage of current across the surface due to the presence of surface contaminants, hereinafter termed "tracking resistance."

The fire-retardant characteristics of the composition of the invention are conveniently determined using the Underwriters Laboratories Test Standard UL94. Using the Vertical Burning Test of this Standard the compositions of the invention should have a rating of 94VI or better when tested on samples having a thickness of 1.6 mm both when conditioned at a relative humidity of 50% for 48 hours or at 70° C for 1 week.

The tracking resistance of the compositions is conveniently determined by the method set out in the method of DIN 53480/1972 (KC Method). The compositions when tested according to this method should have a comparative tracking resistance of at least 300, preferably at least 375, and more desirably at least 500, that is having a tracking resistance in the specified test of at least 300 volts and preferably at least 375 volts and more desirably at least 500 volts.

In order to achieve a fire-retardancy rating according to the UL94 Vertical Burning Test of VI at a thickness of 1.6 mm and a tracking-resistance rating of Class KC 300 according to the method of DIN 53480/1972 the composition should contain at least 5% by weight of zinc borate and not more than 1.5% by weight of the specified oxides. Whilst it is not difficult to achieve the required fire-retardancy rating using sufficient of the specified oxides alone such a composition would have relatively poor tracking resistance. If the concentration of antimony oxide is increased above 1.5% by weight in the presence of at least 5% by weight zinc borate an adequate fire retardancy is obtained but the tracking resistance deteriorates below the desired value. The preferred levels of zinc borate are from 7 to 20% by weight of the composition. Preferred levels of the specified oxides are from 0.1 to 1.0% by weight of the composition.

In addition to the advantages of the excellent combination of fire retardancy and tracking resistance articles moulded from the composition show equivalent mechanical properties, such as tensile strength, to known fire-retardant compositions which achieve their fire retardancy from the use of halogenated fire retardants and either antimony oxide or zinc oxide as the sole synergist.

By "a zinc borate that is thermally stable at processing temperatures of the polyamide" is meant a form which does not evolve significant amounts of volatile material when used at the processing temperature of the polyamide. This requirement is important because materials which give such volatile products can give rise to processing difficulties particularly when the composition is extruded as a lace. The preferred form of zinc borate is of the form $2ZnO.3B_2O_3.xH_2O$, where $x$ is between 3.3 and 3.7. This material does not lose appreciable amounts of water below 300° C. The preparation of such compounds is described in British patent specification No. 1,184,967. The higher hydrates for example $2ZnO.3B_2O_3.7H_2O$ and $2ZnO.3B_2O_3.9H_2O$ lose water below the processing temperatures of most polyamides and are therefore unsuitable except for use with low melting point polyamides because they are difficult to blend with polyamides such as nylon 66 and nylon 6 and would present problems during melt fabrication of the compositions into shaped articles. Anhydrous zinc borate may be used but the results obtained are generally inferior to those obtained using the hydrated form $2ZnO.3B_2O_3.xH_2O$ where $x$ is between 3.3 and 3.7, particularly $2ZnO.3B_2O_3.3.5H_2O$.

The halogenated fire retardants may be selected from a variety of known materials but it is preferred to use the compounds described in British patent specification No. 1,090,598. Of these the compound having the structure:

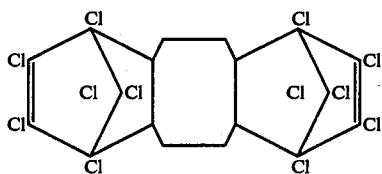

hereinafter referred to by the formula $C_{18}H_{12}Cl_{12}$ is a particularly useful material because of its stability at polyamide processing temperatures and its effectiveness as a fire retardant. Although as little as 5% of these materials by weight of the composition is effective in significantly reducing the flammability of the polyamide it is preferred to use from 7 to 20% for optimum effect. Other fire retardants suitable for use in the invention are the brominated diphenyls and diphenyl ethers such as decabromodiphenyl ether. Amounts of fire retardants greater than 20% may tend to cause deterioration in the physical properties of articles formed from the composition and add considerably to the cost of the composition. Higher concentrations may however be included particularly when it is intended that the concentration of additives in the polyamide composition will be adjusted by the fabricator by blending the composition with further polyamide or polyamide containing additives such as glass. When this technique (hereinafter termed the 'masterbatch' technique) is adopted the compositions of the invention may contain up to 30% by weight of polyamide of the halogenated fire-retardant additive.

The weight ratio of the halogenated flame retardant to the total synergist system of zinc borate and specified metal oxide is normally between about 1:3 and 2:1, preferably between 1:2.5 and 1:1 and more desirably between 1:2 and 1:1.

The polyamides of the invention are synthetic polyamides produced by polymerising monoamino-monocarboxylic acids, or lactams thereof, or a mixture of a diamine and a dicarboxylic acid optionally together with a monoamino-monocarboxylic acid. Suitable monoamino-monocarboxylic acids, or lactams thereof are, for example ε-aminocaproic acid, caprolactam, 9-aminononanoic acid, 11-aminoundecanoic acid, 17-aminoheptodecanoic acid, dodecanolactam, capryllactam and enanthrolactam.

Preferred diamines are of general formula $H_2N(CH_2)_mNH_2$ wherein $m$ is an integer of from 2 to 12 such as trimethylene diamine, tetramethylene diamine, pentamethylene diamine and in particular hexamethylene diamine. Preferred dicarboxylic acids are of the formula $HOOC.Y.COOH$ wherein Y is a divalent aliphatic radical containing at least 2 carbon atoms for example sebacic acid, octadecanoic acid, suberic acid, azelaic acid, undecanoic acid, glutaric acid, pimelic acid and in particular adipic acid.

Preferred polyamides are those known as nylon 6 (a polymer of caprolactam), nylon 66 (a polymer of hexamethylene adipamide), nylon 610 (a polymer of hexamethylene sebacamide), nylon 11 (a polymer of undecanolactam) and nylon 12 (a polymer of dodecanolactam). Mixtures of polyamides and copolymers formed from the monomers described are also included within the term "polyamide" as used in this specification.

The reinforcing agents for use in the invention are any materials giving rise to an increase in strength of the composition and include glass fibres, ballotini, fibrous asbestos or mixtures of these materials. It is preferred to use between 20 and 40% of reinforcing agent although higher concentrations may be used particularly where it is intended to dilute the composition with further polyamide prior to fabrication.

The compositions of the invention are conveniently made by mechanically blending the polyamide, the reinforcing agent, the halogenated fire retardant and the synergist including zinc borate. Whilst this operation may be conducted at any state of the polymerisation of the polyamide the preferred method of obtaining an intimate blend of the composition in granule form involves the use of a screw extruder to intimately mix the ingredients in molten polyamide, subsequently extruding the mixture and chopping the extrudate into granule form. The ingredients fed to the extruder may consist of a simple tumbled blend of the ingredients or the components may be individually metered to the extruder. When using the preferred hydrated form of zinc borate care should be taken to reduce shear heating in the extruder to a minimum to avoid decomposition of the hydrate.

The compositions of the invention may include various other additives such as pigments, dyestuffs, antioxidants, light and heat stabilisers and nucleating agents. It should be noted that these ingredients, particularly pigments, may have some affect on the specified properties, particularly tracking resistance, and it may be necessary to carry out some slight adjustment of the active ingredient concentration in the composition to compensate for such change. Furthermore, whereas it may be relatively easy to produce compositions having a comparative tracking resistance of at least 300 and a UL94 rating of 94VI on 1.6 mm thick samples without including the zinc borate reinforced metal oxide mixtures hereinbefore specified when the reinforced polyamide contains no pigments, the present invention enables this combination of properties to be obtained even when materials which promote tracking are present. Lubricants which improve the ease of dispersion of the ingredients in the polyamide and release of fabricated articles from the moulds may also be included. In addition solid lubricants which reduce wear on the fabricated articles in service may also be included. These include graphite, molybdenum disulphide and finely divided polytetrafluoroethylene.

The compositions of the invention are normally prepared in a granular form for use in moulding processes. Such granules are used for fabricating high strength articles with a high level of tracking resistance such as terminal blocks, switches and similar insulating parts in transformers and other electrical equipment and appliances.

The invention is further illustrated by reference to the following examples. All percentages by weight in the examples are based on the total weight of the composition except where indicated.

The tests employed in the Examples are as follows:
Comparative Tracking Resistance: according to DIN 53480/1972 (KC Method)
Burning Performance: according to the Vertical Burning Test of Underwriters Laboratories' specification No. 94 using samples 1.6 mm thick. Samples are tested (a) after conditioning at 50% relative humidity for 48 hours and (b) after conditioning at 70° C for 1 week.
Tensile strength: ASTM Method D 638-72.

COMPARATIVE EXAMPLE A

Polyamide compositions based on nylon 66 were compounded in a vented screw extruder at about 280° C to give the compositions tabulated below. The burning performance and tracking resistance were assessed using the specified test methods:

| Glass Fibre Content % by wt | Fire Retardant % by wt | Zinc Oxide % by wt | Comparative Tracking Resistance (CTR) | UL94 Rating 50% RH[a] | UL94 Rating 70° C[b] |
|---|---|---|---|---|---|
| 0 | 15.4 | 7.7 | >600 | VI | VI |
| 28 | 11.0 | 5.5 | 300 | VI | VI |

[a]Measured on a sample 1.6 mm thick after conditioning for 48 hours at 50% Relative Humidity.
[b]Measured on a sample 1.6 mm thick after conditioning for one week at 70°C.

(a) Measured on a sample 1.6 mm thick after conditioning for 48 hours at 50% Relative Humidity.

(b) Measured on a sample 1.6 mm thick after conditioning for 1 week at 70° C.

The results illustrate the much greater difficulty of obtaining an acceptable combination of fire retardancy and tracking resistance in glass-filled compositions than in a similar unfilled composition. The filled composition containing 28% glass fibre was further modified by including 1% of carbon black based on the weight of the polyamide in the composition. Whilst the burning performance of the composition was unchanged the CTR value fell to 250.

COMPARATIVE EXAMPLE B

Polyamide compositions based on nylon 66 were compounded in a vented screw extruder at about 280° C with 28% by weight of a glass fibre sized with a system including a silane coupling agent, 0.5% of zinc stearate as lubricant and the various other additives tabulated below. The compositions were extruded into lace, cooled and chopped into granules. Test samples suitable for the tests required were prepared by injection moulding. The results obtained were as follows:

| Additive | UL94 Rating 50% RH | UL94 Rating 70° C | Tensile Strength MN/m² | Comparative Tracking Resistance (CTR) |
|---|---|---|---|---|
| 15% by weight zinc borate[a] | FAIL | FAIL | 141 | >600 |
| 10% by weight 'Dechlorane' 515[b] | FAIL | FAIL | 147 | 300 |
| 10% by weight 'Dechlorane' 515 + 5% $Sb_2O_3$ | VO | VO | 140 | 200 |

[a]'ZB2335' supplied by Borax Consolidated Limited.
[b]'Dechlorane' 515 supplied by Hooker Chemicals having the chemical formula $C_8H_{12}Cl_{12}$ as described on page 5.

These results indicate the difficulty of combining the properties of high levels of fire retardancy and good resistance to tracking in glass-filled polyamide compositions.

(a) 'ZB2335' supplied by Borax Consolidated Limited.

(b) 'Dechlorane' 515 supplied by Hooker Chemicals having the chemical formula $C_8H_{12}Cl_{12}$ as described on page 5.

EXAMPLE 1

The procedure of Comparative Example A was repeated to prepare the compositions listed below, all of which contained 28% by weight of glass fibre and 0.5% zinc stearate:

| 'Dechlorane' 515 % by wt | 'ZB2355' % by wt | $Sb_2O_3$ % by wt | CTR | UL94 Rating 50% RH | UL94 Rating 70° C | Tensile Strength MN/m² |
|---|---|---|---|---|---|---|
| 10 | 15 | 0.1 | 500 | VI | VI | 138 |
| 10 | 15 | 0.5 | 500 | VI | VI | 148 |
| 10 | 15 | 1.0 | 475 | VO | VI | 137 |
| 10 | 15 | 2.0 | <350 | VO | VO | — |
| 10 | 15 | 4.0 | <300 | VO | VO | — |

These results indicate that a combination of acceptable burning performance (94VI) and a tracking resistance rating in excess of 375 can be obtained if the antimony oxide concentration is kept below about 1.5% by weight.

EXAMPLE 2

The procedure of Example 1 was repeated to give compositions containing 28% by weight of glass, 0.5% by weight zinc stearate, 12% by weight of 'Dechlorane' 515, 9% by weight of zinc borate ('ZB2335') and varying amounts of antimony oxide. Results obtained from evaluation of these compositions are tabulated below:

| $Sb_2O_3$ % by wt | CTR | UL94 Rating 50% RH | UL94 Rating 70° C | Tensile Strength MN/m² |
|---|---|---|---|---|
| 0.1 | 475 | VI | VI | 141 |
| 0.5 | <375 | VI | VI | 135 |
| 1.0 | 375 | VI | VI | 109 |

These results indicate that at the reduced level of zinc borate compared with Example 2 inferior results are obtained but an acceptable balance of fire retardancy and tracking resistance is obtained, particularly at the lower levels of antimony oxide.

EXAMPLE 3

The procedure of Example 1 was used to prepare compositions containing varying concentrations of glass fibre. The compositions all contained 10% by weight 'Dechlorane' 515, 15% by weight 'ZB2335', 0.5% by weight antimony oxide and 0.5% by weight zinc stearate. The evaluation results obtained were as follows:

| Glass content % by weight | CTR | UL94 Rating 50% RH | UL94 Rating 70° C |
|---|---|---|---|
| 28 | 500 | VI | VI |
| 20 | 400 | VI | VI |
| 15 | 350 | VI | VI |

The results indicate that the glass content has an effect on the Comparative Tracking Resistance and that at glass contents of about 15% by weight difficulty is experienced in obtaining a CTR value of 375 although by appropriate adjustment of the concentrations of the other additives this should be possible.

EXAMPLE 4

Because of the added difficulty of obtaining acceptable CTR values in the presence of certain pigments evaluations were carried out using an ingredient known to cause reduction in CTR values. Such an ingredient is 'Nigrosine Base NB', (classified in the Colour Index as Solvent Block 7) and supplied by Williams of Hounslow Ltd.

In the compositions evaluated below both contained 28% by weight glass fibre, 10% by weight 'Dechlorane' 515, 15% by weight 'ZB2335' and 0.5% by weight zinc stearate.

| Nigrosine % by wt | $Sb_2O_3$ % by wt | CTR | UL94 Rating 50% RH | 70° C |
|---|---|---|---|---|
| 0 | 0.5 | 450 | VI | VI |
| 0.25 | 0.5 | 375 | VI | VI |

These results indicate that a tracking resistance rating of 375 can be obtained in the presence of Nigrosine by the inclusion of synergist system of the invention. Similar results are obtained when the Nigrosine is replaced by 0.25% carbon black by weight of the polyamide used. (CTR value = 375, UL94 rating of 94VI).

EXAMPLE 5

A composition containing 46.7% by weight of a polyamide based on nylon 66, 10% by weight 'Dechlorane' 515, 20% by weight zinc borate ($2ZnO.3B_2O_3.3.5H_2O$), 0.5% by weight antimony oxide, 0.5% by weight zinc stearate and 22.3% of glass fibre was compounded at 280° C, extruded under water and chopped into granules. The composition had a flame retardant rating of 94VI when tested according to the Underwriters Laboratories Standard Test after the prescribed conditioning. The comparative tracking resistance was 525.

We claim:

1. A reinforced polyamide composition comprising:
   from 30 to 74.95% of a normally flammable polyamide,
   from 15 to 59% of a reinforcing agent,
   from 5 to 30% of a halogenated flame retardant, containing at least 20% by weight of the flame retardant of halogen,
   together with a synergist system for the flame retardant comprising a mixture of
   from 5 to 30% by weight of a zinc borate that is thermally stable at the processing temperatures of the polyamide, and
   from 0.05 to 1.5% of an oxide selected from the group consisting of antimony oxide, zinc oxide, lead oxide, ferrous oxide, ferric oxide, stannous oxide, stannic oxide, cadmium oxide and a mixture thereof,
   wherein all percentages of all ingredients are by weight of the total weight of composition.

2. A reinforced polyamide composition according to claim 1 in which the oxide is antimony oxide.

3. A reinforced polyamide composition according to claim 1 in which the concentration of the oxide component is between 0.1 and 1.0%.

4. A reinforced polyamide composition according to claim 1 in which the weight ratio of halogenated flame retardant to the synergist system of zinc borate and metal oxide is between 1:3 and 2:1.

5. A reinforced polyamide composition according to claim 4 in which the weight ratio is between 1:2 and 1:1.

6. A reinforced polyamide composition according to claim 1 containing from 20–40% by weight of reinforcing agent.

7. A reinforced polyamide composition according to claim 1 having a comparative tracking resistance of at least 300 as determined by the method of DIN 53480/1972 (KC Method) and a fire retardant rating of 94VI or better as determined on samples of thickness 1.6 mm according to Underwriters Laboratories Test Standard UL94.

8. A reinforced polyamide composition according to claim 7 in which the comparative tracking resistance is at least 375.

9. A reinforced polyamide composition according to claim 1 in which the reinforcing agent is glass fibre.

10. A reinforced polyamide composition according to claim 1 in which the zinc borate is of the form $2ZnO.3B_2O_3.3.5H_2O$.

11. An arc and tracking resistant reinforced polyamide composition comprising in percent by weight of the total composition:
   (a) from 30 to 74.95% of a normally flammable polyamide;
   (b) from 15 to 55% of a glass fiber reinforcing agent;
   (c) from 5 to 30% of a halogenated frame retardant, containing at least 20% by weight of said frame retardant of halogen;
   together with a synergist system for said
   flame retardant which comprises a mixture of
   (d) from 5 to 30% of a zinc borate that is thermally stable at processing temperatures of the polyamide, and;
   (e) from 0.05 to 1.5% of an oxide selected from the group consisting of antimony oxide, zinc oxide, lead oxide, ferrous oxide, ferric oxide, stannous oxide, stannic oxide and cadmium oxide or a mixture thereof, tht total of components (a) through (e), inclusive, being 100 weight percent,
   said composition having a comparative tracking resistance of at least 300 as determined by the method of DIN 53480/1972 (KC Method) and a fire retardant rating of 94VI or better as determined on samples of thickness 1.6 mm according to Underwriters Laboratories Test Standard UL94.

12. A reinforced polyamide composition according to claim 11 in which the oxide of component (e) is antimony oxide and the weight ratio of the halogenated flame retardant component (c) to the total of the zince borate and antimony oxide synergist system components (d) and (e) is between 1:3 and 2:1.

13. A reinforced polyamide composition according to claim 12 in which the weight ratio is between 1:2 and 1:1.

14. A reinforced polyamide composition according to claim 11 in which the comparative tracking resistance is at least 375.

* * * * *